United States Patent [19]

Ikeda et al.

[11] Patent Number: 4,590,514
[45] Date of Patent: May 20, 1986

[54] COLOR IMAGE PROCESSING APPARATUS

[75] Inventors: Yoshinori Ikeda, Matsudo; Nobuo Matsuoka, Yokohama, both of Japan

[73] Assignee: Canon Kabushiki Kaisha, Tokyo, Japan

[21] Appl. No.: 512,630

[22] Filed: Jul. 11, 1983

[30] Foreign Application Priority Data

Jul. 19, 1982 [JP] Japan .............................. 57-124361
Jul. 19, 1982 [JP] Japan .............................. 57-124362

[51] Int. Cl.⁴ ........................................ H04N 1/46
[52] U.S. Cl. .................................................. 358/75
[58] Field of Search ........................................ 358/75

[56] References Cited

U.S. PATENT DOCUMENTS 4,206,475  6/1980  Taudt ................................. 358/75
4,305,093 12/1981  Nasu ................................. 358/75
4,369,461  1/1983  Tamura ............................. 358/75
4,503,457  3/1985  Ikuta ................................. 358/75

Primary Examiner—Michael A. Masinick
Attorney, Agent, or Firm—Fitzpatrick, Cella, Harper & Scinto

[57] ABSTRACT

A color image processing apparatus color-decomposes an original color image to produce image signals of different colors and samples the image signals at different timings for the respective colors to reproduce a color image.

8 Claims, 7 Drawing Figures

COLOR IMAGE PROCESSING APPARATUS

BACKGROUND OF THE INVENTION

1. Field of the Invention

The present invention relates to an image processing apparatus having a solid-state image pickup device used in a digital color copying machine, a color facsimile or an image file, and more particularly to a color image processing apparatus having an improved color balance for a read image data.

2. Description of the Prior Art

A digital color copying machine which uses an image read unit having a solid-state image pickup device such as a charge coupled device (CCD) and processes an electrical signal to reproduce an image by a digital printer such as a laser beam printer or an ink jet printer has been known. In such an apparatus, a color image read unit as shown in FIG. 1 is commonly used. Referring to FIG. 1, light reflected by an original 2 illuminated by an illumination lamp 1 is focused onto a solid-state image pickup device 7 comprising a color decomposing filter 5 and a CCD 6, through a mirror 3 and a lens 4 to constitute an image data.

The image data thus provided is sequentially transferred one line at a time in synchronism with a clock pulse from an oscillator 8 as shown in FIG. 2, amplified by an amplifier 9, and converted to a digital image data of a predetermined number of bits for each pixcel by an analog-to-digital converter 10. The digital image data is than supplied to a dither circuit 11, which compares it with a predetermined dither pattern stored in a ROM to encode the digital data. The encoded data is temporarily stored in a buffer memory 12.

In the prior art image read unit, the color decomposing filter, 5 comprises three filters one for each of the three principal colors R, G and B, and the image data of the respective principal colors are read through the respective filters. In order to improve tonality of a reproduced color image or to improve a color balance, different dither patterns are used in the dither circuit 11 of the read unit of FIG. 2 for the respective principal colors, or the light intensity of the illumination lamp 1 is changed for each of the principal colors. However, since the complex dither patterns are required, the selection of a proper dither pattern is difficult to attain and fine control of the light intensity is also difficult to attain. Accordingly, a satisfactory improvement is not attained.

SUMMARY OF THE INVENTION

It is an object of the present invention to provide a color image processing apparatus which produces an image output signal suitable to reproduce a high quality color image.

It is an another object of the present invention to provide a color image processing apparatus which reliably and stably improves a color balance of a reproduced color image by ready-to implement means.

It is an other object of the present invention to provide a color image processing apparatus which compensates for a variation of read outputs for respective colors when an image is color-decomposed and read.

It is a further object of the present invention to provide a color image processing apparatus which can readily adjust a color of a reproduced image.

The above and other objects of the present invention will be apparent from the following description of the invention.

DETAILED DESCRIPTION OF THE PREFERRED EMBODIMENTS

Figure 3:
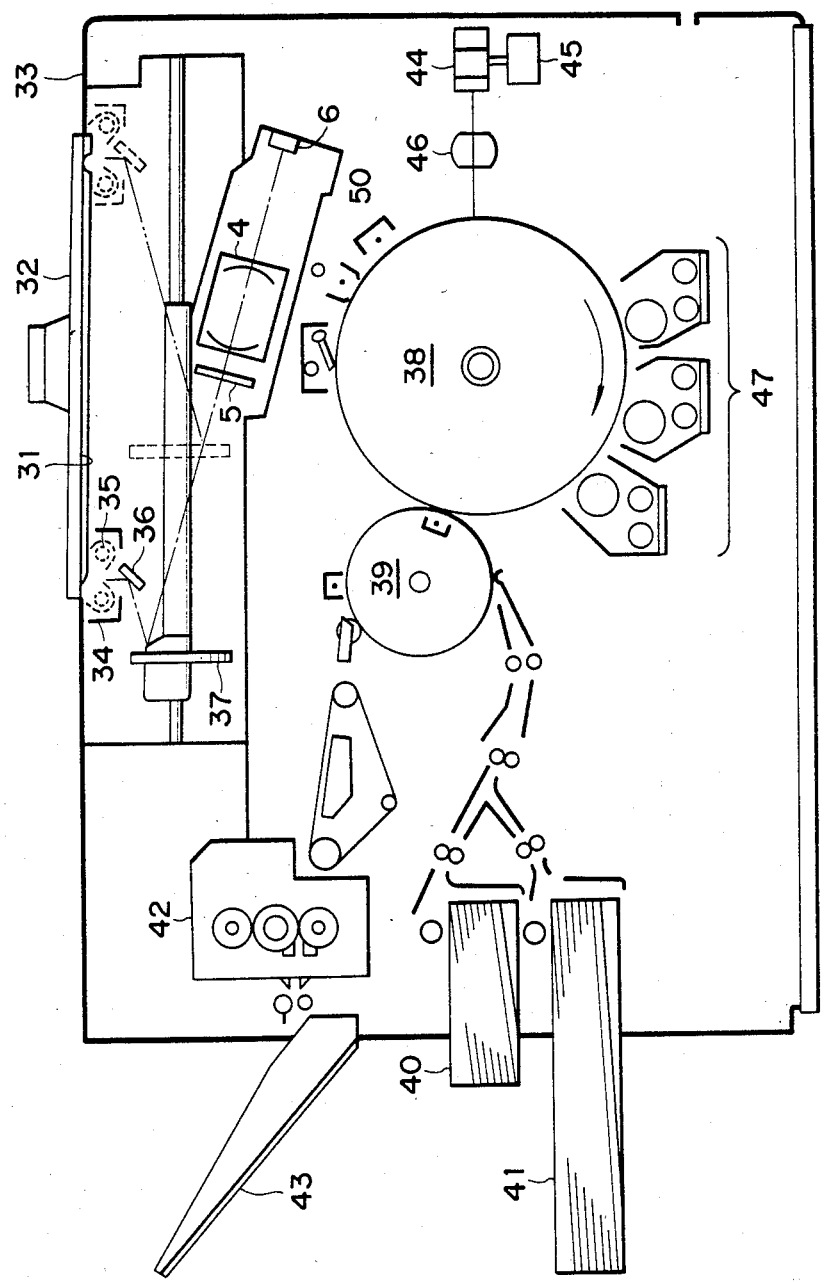
FIG. 3 shows a configuration of a color copying machine.

FIG. 3 shows a construction of a color copying machine to which the present invention is applied, numeral 31 denotes an original mount such as a glass plate on which an original cover 32 is releasably mounted. Under the original mount 31, a scanning platform 34 is movably mounted in a casing 33 such that it is moved from a left end position to a right end position shown in FIG. 3.

The scanning platform 34 has a light source 35 having a reflector and a first mirror 36 which receives light reflected by the original. The light reflected by the original and received by the first mirror 36 is reflected by a second mirror 37 and color-decomposed by a color-decomposing filter 5, and then applied to a CCD 6 through an optical lens 4. The color decomposing filter 5 comprises three filters of principal colors R, G and B. One original is exposed three times with different filters so that the original images color-decomposed to the respective colors of R, G and B are applied to the CCD 6.

The three color image signals read by the CCD 6 are processed in a manner to be described later and the processed signals are sequentially applied to a semiconductor laser oscillator not shown. The semiconductor laser oscillator emits a laser beam modulated by the applied image signal to a polygon mirror 44, which is rotated at a constant velocity by a motor 45 and deflects the applied laser beam to a substantially horizontal plane. An optical path length of the deflected laser beam is corrected by an f-θ lens and then it scans a surface of a photosensitive drum 38 which is rotated in a direction of an arrow at a constant velocity. The photosensitive drum 38 is uniformly charged by a charger 50 and electrostatic latent images of the respective colors are formed on the surface thereof by the laser beam scan. The latent images on the photosensitive drum 38 are developed by a developing unit 47 with toners of corresponding colors (i.e. cyan, magenta and yellow). A record paper of a desired size is fed from a cassette 40 or 41 and wrapped around a transfer drum 39. The three color toner images sequentially developed on the photosensitive drum 38 are transferred to the record paper in superposition. The record papers having the three color images transferred thereon is removed from the transfer drum 39 and fed to a fixing unit 42 where the toners are fixed to the record paper by heat and pressure and then the record paper is ejected to an ejection tray 43.

Figure 4:
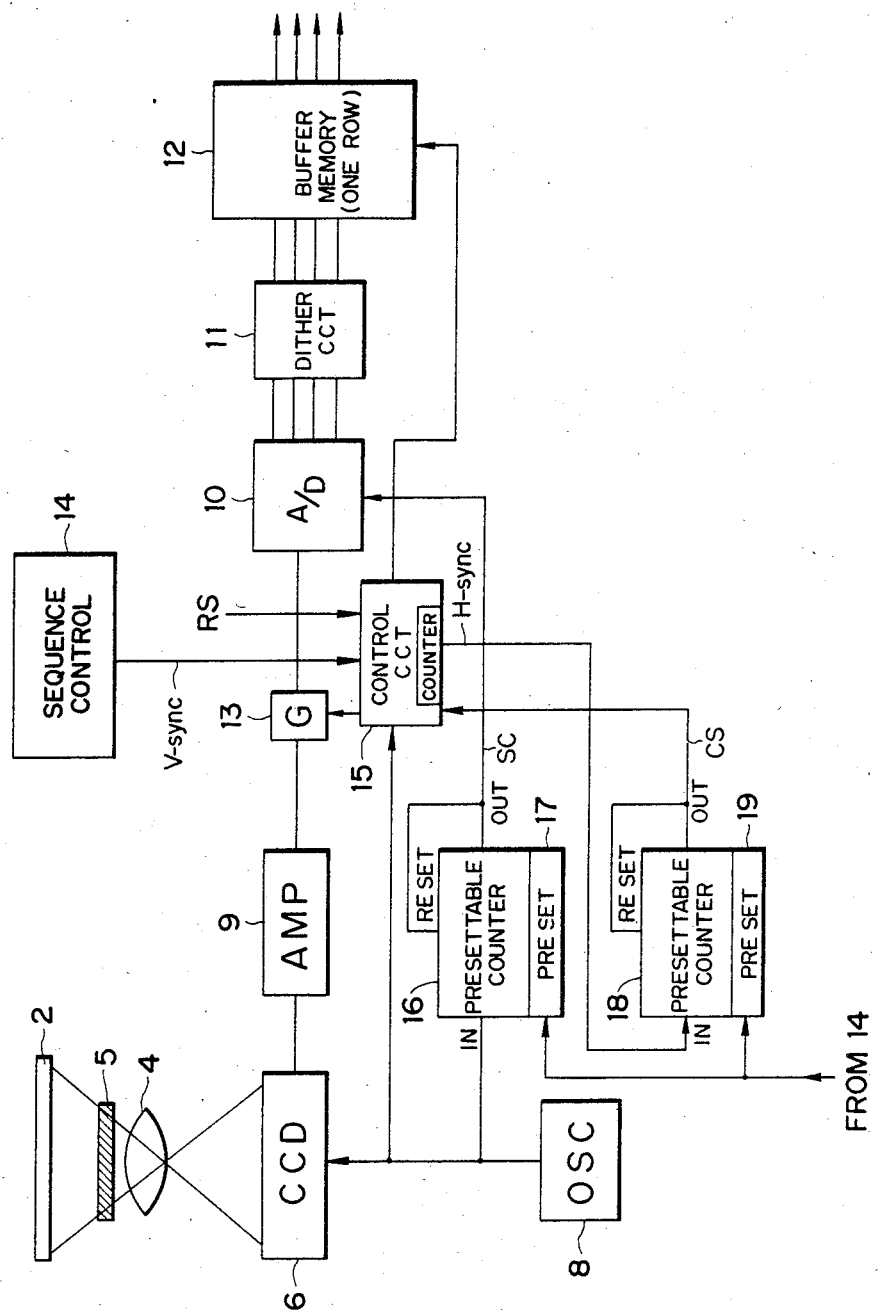
FIG. 4 is a block diagram of an image processing apparatus.

FIG. 4 shows an embodiment of a circuit of the image processing apparatus of the present invention. At the start of the operation, a read signal RS as a timing signal to start the exposure, which is produced by detecting the position of the photosensitive drum of the color laser beam printer, is sent to a timing control circuit 15 to open a gate 13. When the printer is to be synchronized during the image read operation, the read signal RS may be a detection signal by a sensor which detects the original 2. The light reflected by the original 2 is applied to a CCD 6 through a color decomposing filter 5 and a lens 4. The image data serially transferred from the CCD 6 in synchronism with a clock pulse from an oscillator 8 is amplified by an amplifier 9 and supplied to an analog-to-digital converter 10 through the gate 13 which is now open, and it is converted to a digital image data of a predetermined number of bits. The output of the oscillator 8 is also supplied to a presettable counter 16 which counts up image data transfer clock pulses and resets the count each time the count reaches the preset count. The counter 16 also supplies a sampling clock SC to the analog-to-digital converter 10. The preset count of the counter 16 is set to a predetermined value or by a sequence controller 14 any value selected by an operator for each of the principal colors in order to compensate for color balances which are determined by the exposure times through the color decomposing filter 5, that is, the blue (B) filter, the green (G) filter and the red (R) filter, a signal produced when the count of the counter 16 and the preset count are equal is supplied to the analog-to-digital converter 10 as the sampling clock SC. Accordingly, the image data transferred to the analog-to-digital converter 10 by the transfer clock are converted to the digital image signals at a rate divided by the preset count.

Figure 5:
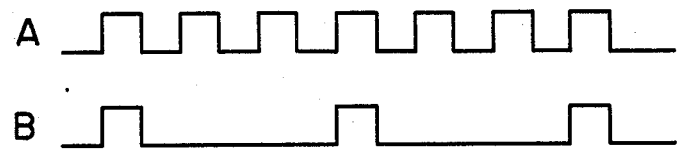
FIGS. 5A and 5B show waveforms for illustrating a manner of sampling rate setting.
Figure 6:
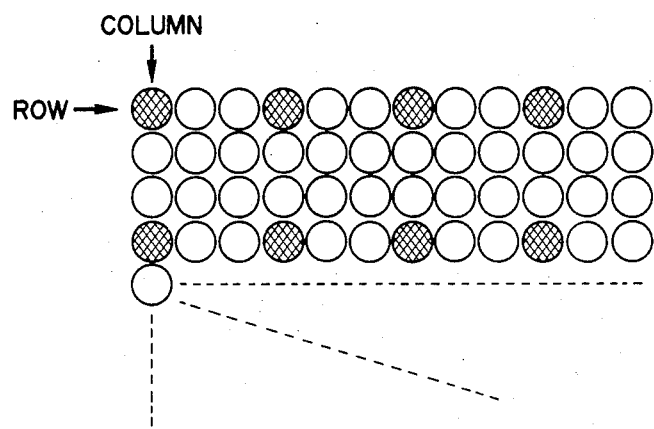
FIG. 6 is a diagram illustrating a manner of sampling.

Thus, for the transfer clock pulse sequence shown in FIG. 5A, the sampling clock pulses SC for the analog-to-digital conversion are reduced in number in accordance with the preset count as shown in FIG. 5B, and an array of pixel matrix recorded by the digital image data thus processed is shown by dark dots in FIG. 6. In the illustrated example, the preset count of the counter 16 is three.

As seen from the above description, the color balance of the reproduced color image is readily adjusted by the simple signal processing of changing the sampling rate in digitizing the image data from the solidstate image pickup device for each of the principal colors so that a satisfactory color tone is obtained. The timing control circuit 15 has a counter to count one line of transfer clock pulses. Assuming that the number of the pixel columns in one line is 8 lines/mm and the length of line is 245 mm, when the internal counter counts 245×8=1960, a horizontal synchronizing signal $H_{SYNC}$ is supplied to another presettable counter 18. The counter 18 has been preset to the same count as that of the counter 16 (although it may be preset to a different count) and the signal CS produced when the count reaches the preset count is fed back to its own reset input to self-reset the counter 18. The signal CS is also supplied to the timing control circuit 15.

Figure 7:
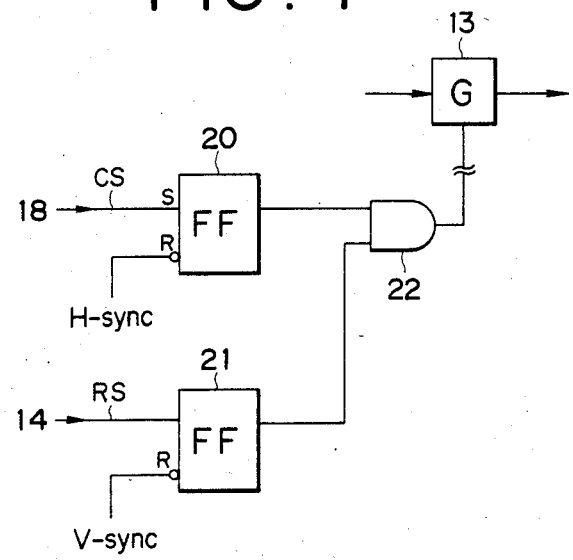
FIG. 7 is a block diagram of a timing control circuit.

The timing control circuit 15 is constructed as shown in FIG. 7. Output signals from flip-flops 20 and 21 which are set by the signal CS from the counter 18 and the read signal RS from the sequence controller 14, respectively, are supplied to an AND gate 22 to open and close the gate 13 by the output signal of the AND gate 22. The flip-flop 20 is reset by the horizontal synchronizing signal $H_{SYNC}$ which is produced at every one line of pixel count. The flip-flop 21 is set by the read signal RS when an image read period signal $V_{SYNC}$ supplied from the sequence controller 14 is at a high level and reset by the fall of the period signal $V_{SYNC}$. Accordingly, the digital image data is sampled with a reduced number of scan lines. The reduced number of scan lines is equal to the number of clock pulses divided by the preset count which is preset for each of the principal colors.

Thus, by the simple signal processing of changing the sampling timing for each of the colors to change the pixel interval in the matrix array to control the recording density for each of the colors, the color balance of the color image reproduced by the matrix array of the pixels by the image data from the solid-state image pickup device is readily adjusted to reproduce a color image of a satisfactory color tone.

For example, when the row pitch and the column pitch for a magenta image are increased and the row pitches and column pitches for the yellow image and the cyan image are reduced, the number of pixels in a given area of the magenta image is smaller than those in the yellow image and the cyan image for the color image having a dominant mazenta tone, and the dominant mazenta tone in the original 2 is suppressed in the reproduced image and an image of a balanced color tone is reproduced. A variation of the sensitivity of the solid-state image pickup device or CCD for different wavelengths can also be compensated for. By properly selecting the preset count of the counter 18 for each of the principal colors R, G and B by the sequence controller 14, the color tone of the reproduced color image can be readily adjusted. The variation of the sensitivity of the photosensitive material used to print the reproduced color image can be readily compensated.

Figure 1:
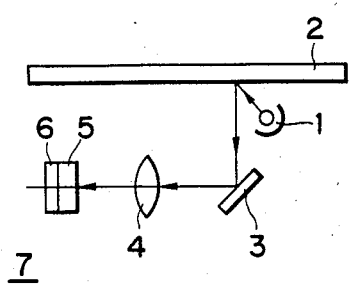
FIG. 1 is a schematic diagram of a prior art image read unit.
Figure 2:
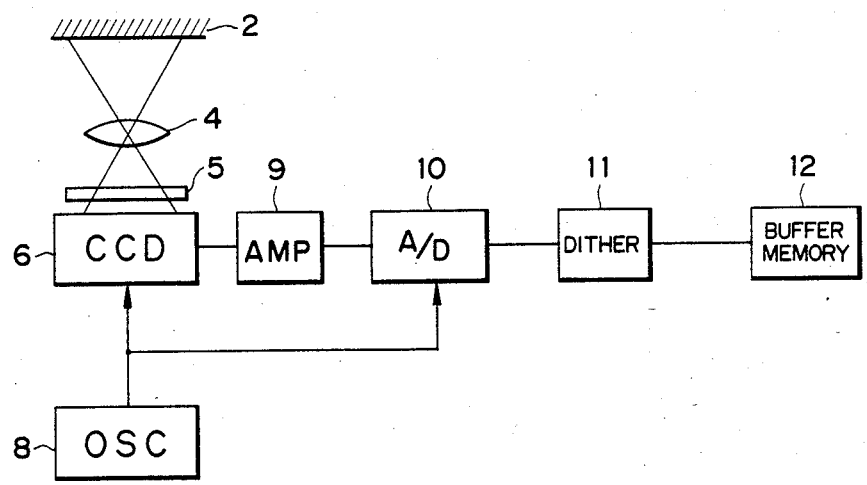
FIG. 2 is a block diagram of the read unit of FIG. 1.

While a certain number of pixels are removed after a certain number of scan lines have been removed in the illustrated embodiment, they may be removed in the opposite sequence to attain the same effect while the sampling points of the pixels are set by frequency dividing the output of the single oscillator 8, a plurality of oscillators having different oscillation frequencies may be used so that sequentially changing sampling values are selected instead of using the frequency devision factors of $\frac{1}{2}, \frac{1}{3}, \frac{1}{4}, \ldots$. The dither circuit 11 and the buffer memory 12 shown in FIG. 2 achieve the same effects as those of the prior art apparatus of FIG. 2.

While the original image is sequentially read out through different ones of the color decomposing filters to sequentially produce the plurality of color image signals in the illustrated embodiment, the present invention is equally applicable to a read unit which uses an image pickup device having a stripe or mosaic filter or a read unit which uses a plurality of image pickup devices one for each color to parallelly produce a plurality of color image signals.

An ink jet printer or a thermal printer may be used as the image recorder.

What is claimed is:

1. A color image forming apparatus comprising:
reading means for reading a color original image on a basis of line to generate color component signals line by line;
recording means for recording on a recording medium a plural member of different color pixels based on the color component signals generated from said reading means to form a color image; and control means for controlling a color tone of the color image to be formed by said recording means by means of varying on each color a recording density of the color pixels to be recorded on the recording medium, said control means comprising gating means for extracting the color component signals entered on a line by line basis at different line intervals for each color, and sampling means for extracting the color component signals entered on a line by line basis at different pixel intervals for each color, wherein said control means controls the color component signals from said reading means so as to be supplied through said gating means and said sampling means to said recording means.

2. A color image forming apparatus according to claim 1, wherein said reading means includes means for optically color-separating the color original image.

3. A color image forming apparatus according to claim 1, wherein said gating means includes means for counting the number of lines related to the entered color component signals, and extracts the color component signals in accordance with the count value of said counting means.

4. A color image forming apparatus according to claim 1, wherein said sampling means includes means for counting the number of pixels related to the entered color components signals, and extracts the color component signals in accordance with the count value of said counting means.

5. A color image forming apparatus according to claim 1, wherein said sampling means comprises means for converting an analog signal to a digital signal.

6. A color image forming apparatus according to claim 1, wherein the line intervals for extraction of the color component signals by said gating means are variable.

7. A color image forming apparatus according to claim 1, wherein the pixel intervals for extraction of the color component signals by said sampling means are variable.

8. A color image forming apparatus according to claim 1, wherein said control means is adapted to vary on each color the number of recording pixels per unit area on the recording medium.

* * * * *

UNITED STATES PATENT AND TRADEMARK OFFICE
CERTIFICATE OF CORRECTION

PATENT NO. : 4,590,514
DATED : May 20, 1986
INVENTOR(S) : Yoshinori Ikeda, et al.

It is certified that error appears in the above-identified patent and that said Letters Patent is hereby corrected as shown below:

Col. 1, line 25, "constitute an" should read --constitute--.
Col. 1, line 30, "pixcel" should read --pixel--.
Col. 1, line 32, "than" should read --then--.
Col. 1, line 37, "filters one" should read --filters, one--.
Col. 1, line 40, "tonality" should read --the tonality--.
Col. 1, line 46, "the complex" should read --complex--.
Col. 1, line 58, "an another" should read --another--.
Col. 1, line 62, "an other" should read --another--.
Col. 3, line 47, "solidstate" should read --solid-state--.
Col. 4, line 25, "mazenta" should read --magenta--.
Col. 4, line 26, "mazenta" should read --magenta--.
Col. 4, line 66, "member" should read --number--.
Col. 6, line 6, "components" should read --component--.

Signed and Sealed this

Seventeenth Day of March, 1987

Attest:

DONALD J. QUIGG

*Attesting Officer*          *Commissioner of Patents and Trademarks*